US010289861B2

(12) United States Patent
Anderson et al.

(10) Patent No.: US 10,289,861 B2
(45) Date of Patent: May 14, 2019

(54) PERMISSION-BASED SECURE MEDIA CONTENT SHARING

(71) Applicant: Intel Corporation, Santa Clara, CA (US)

(72) Inventors: Glen J. Anderson, Beaverton, OR (US); Robert Adams, Lake Oswego, OR (US); Yevgeniy Yarmosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 15/200,117

(22) Filed: Jul. 1, 2016

(65) Prior Publication Data

US 2018/0007546 A1    Jan. 4, 2018

(51) Int. Cl.
| | | |
|---|---|---|
| *G06F 7/04* | (2006.01) |
| *G06F 17/30* | (2006.01) |
| *H04N 7/16* | (2011.01) |
| *G06F 21/62* | (2013.01) |
| *H04L 29/08* | (2006.01) |
| *H04B 1/3827* | (2015.01) |
| *H04L 12/58* | (2006.01) |
| *H04L 29/06* | (2006.01) |

(52) U.S. Cl.
CPC ...... *G06F 21/6227* (2013.01); *G06F 21/6263* (2013.01); *H04B 1/385* (2013.01); *H04L 51/04* (2013.01); *H04L 63/10* (2013.01); *H04L 67/02* (2013.01); *H04L 67/10* (2013.01); *H04L 2209/60* (2013.01)

(58) Field of Classification Search
None
See application file for complete search history.

(56) References Cited

U.S. PATENT DOCUMENTS

| | | | | |
|---|---|---|---|---|
| 8,613,070 B1 * | 12/2013 | Borzycki | ............ | G06F 21/6218 726/8 |
| 8,812,590 B2 * | 8/2014 | Losacco | .............. | H04L 67/1078 709/203 |
| 9,495,547 B1 * | 11/2016 | Schepis | ................. | G06F 21/604 |
| 9,621,555 B2 * | 4/2017 | Odenheimer | ........... | H04L 63/10 |
| 2009/0276829 A1 * | 11/2009 | Sela | ........................ | G06F 21/10 726/2 |

(Continued)

*Primary Examiner* — Christopher A Revak
*Assistant Examiner* — Vadim Savenkov
(74) *Attorney, Agent, or Firm* — Schwegman Lundberg & Woessner, P.A.

(57) ABSTRACT

Embodiments of a system and method for sharing media content are generally described herein. A method may include receiving, from a first clearing device, a first indication of approval for sharing media content from an originating device, the first indication identifying the originating device, sending an encryption key for sharing the media content to the originating device, receiving an encrypted file, the encrypted file including the media content encrypted using the encryption key from the originating device, sending the encryption key and the encrypted file to a second clearing device, receiving, from the second clearing device, a second indication of approval for viewing media content, the second indication identifying a destination device, and sending, in response to receiving the second indication of approval, the encryption key and the encrypted file to the destination device.

19 Claims, 6 Drawing Sheets

(56) References Cited

U.S. PATENT DOCUMENTS

| | | | |
|---|---|---|---|
| 2010/0161752 A1* | 6/2010 | Collet | H04L 67/104 709/216 |
| 2013/0151562 A1* | 6/2013 | Fujii | G06F 17/30109 707/780 |
| 2015/0095410 A1* | 4/2015 | Funahashi | H04L 67/2857 709/203 |
| 2018/0091310 A1* | 3/2018 | Branco | H04L 9/0643 |

* cited by examiner

PERMISSION-BASED SECURE MEDIA CONTENT SHARING

BACKGROUND

Certain laws require websites and online services to protect and limit storing of personal information of minors and other wards. The requirement to protect wards' privacy online is often at odds with desires of wards and their caretakers to allow the wards to share content, particularly in a way that is approved by a guardian. Many wards thus simply do not share content. Other wards share content with a caretaker's account or use false age information. These approaches amount to work-arounds that do not protect the wards and often inconvenience the caretakers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for sharing content are described herein. The systems and methods described herein may include components and techniques for receiving, transmitting, and storing content. The content may include images, videos, audio files, text, application data (e.g., map route data, health or exercise data, game data, etc.), games, etc. The components and techniques include options for requesting approval and approving or rejecting content to be shared from an originating device to a destination device. A clearing device may be used to approve or reject content requested to be shared.

Figure 1:
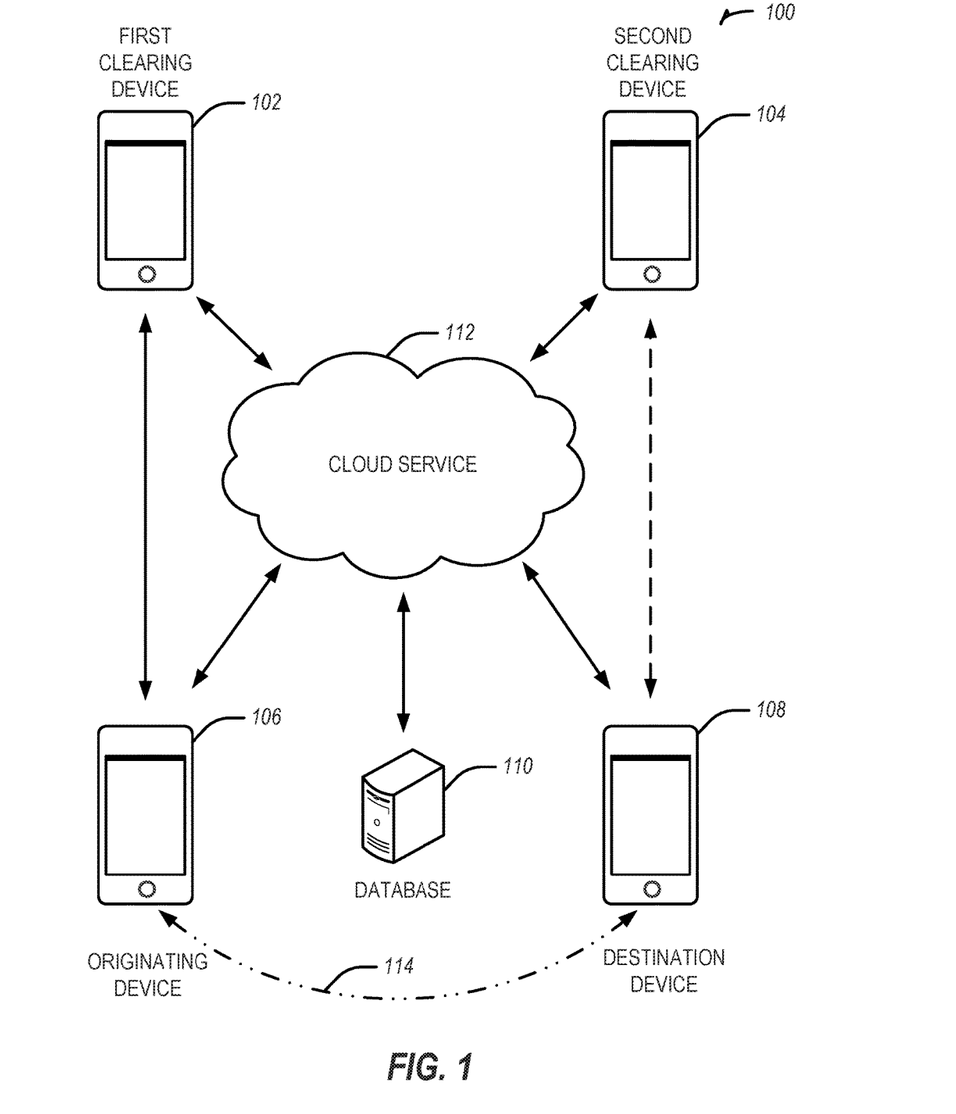
FIG. 1 illustrates a system for sharing media content in accordance with some embodiments.

FIG. 1 illustrates a system 100 for sharing media content in accordance with some embodiments. The system includes a first clearing device 102, a second clearing device 104, an originating device 106, a destination device 108, a database 110, and a cloud service 112. In an example, the cloud service 112 may be implemented on a local computer, a server, a plurality of servers, or the like.

In an example, a user of the originating device 106 selects content to share with the destination device 108. In a typical system, the content would be sent along path 114, directly from the originating device 106 to the destination device 108 using various network or connection mediums. The path 114 presents a problem when the originating device 106 or the destination device 108 is operated by a ward (e.g., a minor, a person with cognitive disabilities, or another vulnerable individual) who may need supervision or permission from a caretaker before sharing or receiving content. To address this problem, the system 100 uses a first clearing device 102 or a second clearing device 104 with a cloud service 112 to verify permission to share or receive content.

In an example, a user of the originating device 106 selects content to ultimately share with the destination device 108. The user of the originating device 106 selects content and transmits the content to the first clearing device 102, the cloud service 112, or both. When the originating device 106 sends the content directly to the first clearing device 102, the first clearing device 102 may approve or deny the request to share content. If the request is approved, the first clearing device 102 may send an indication of approval for sharing the content to the cloud service 112. The cloud service 112 may receive the approval and send a request to the originating device 106 for the content, and the originating device 106 may send the content to the cloud service 112. In another example, the first clearing device 102 may send the indication of approval to the originating device 106, which may, in response, send the content to the cloud service 112. In yet another example, the first clearing device 102 may receive the content from the originating device 106 and send the content to the cloud service 112 with, or instead of, the indication of approval. The content may be received at the cloud service 112 in an encrypted format from the originating device 106 or the first clearing device 102 or the cloud service 112 may encrypt the content upon receipt.

In an example, the first clearing device 102 may act as a clearing device for content shared by the originating device 106. The destination device 108 may or may not use a clearing device. When the destination device 108 has a clearing device, the second clearing device 104 may act as the clearing device. In another example, the second clearing device 104 may be a gatekeeper for the destination device 108 and the originating device 106 may not use the first clearing device 102 as a clearing device. These examples are described in more detail below.

In an example, the originating device 106 and the destination device 108 use a clearing device, the first clearing device 102 for the originating device 106 and the second clearing device 104 for the destination device 108, respectively. The originating device 106 sends a request to share content to the first clearing device 102 or to the cloud service 112, which may then forward the request to the first clearing device 102. In another example, the originating device 106 sends content to be shared to the cloud service 112 and the cloud service 112 sends a request for approval to the first clearing device 102. After the first clearing device 102 approves the content sharing, the cloud service 112 receives an encrypted file including the content in an encrypted format or encrypts the content upon receipt into an encrypted file. Information about the encrypted file is transmitted by the cloud service 112 to the second clearing device 104. The information may include the encrypted file, an encryption key for the encrypted file, a summary of the content (e.g., a series of images, a written description, a collage, a shortened video, a change log, a percentage difference, a list of differences, or the like), or a link. The second clearing device 104 may send, to the cloud service 112, an indication of approval to have the content shared with the destination device 106. In another example, the second clearing device 104 may forward the content to the destination device 108. The destination device 108 receives the content from the cloud service 112 or optionally from the second clearing device 104. The destination device 108 may receive the content in the encrypted file or in an unencrypted state. The destination device 108 may receive the encryption key from the cloud service 112 or the second clearing device 104.

In an example, the cloud service 112 may store the content to be shared in an encrypted file in the database 110. When the content has been shared with the destination device 108 or approval by one of the clearing devices 102 or 104 has been denied, the cloud service 112 may delete the encrypted file from the database. In another example, the cloud service 112 may send and receive the content in an unencrypted file, but may store the content as the encrypted file in the database 110 for later use.

In another example, the originating device 106 uses a clearing device, namely the first clearing device 102, and the destination device 108 does not use a clearing device. The originating device 106 and first clearing device 102 may carry out the functions described above, including sending content or a request to send content, approving or denying the content, and arranging for the cloud service 112 to ultimately receive the content, in an encrypted or unencrypted format. In this example, the cloud service 112 may then directly send the content, in an encrypted or unencrypted format, to the destination device 108, skipping the second clearing device 104.

In an example, the originating device 106 does not use a clearing device, and the destination device 108 uses a clearing device, namely the second clearing device 104. In this example, the originating device 106 may attempt to send the content directly to the destination device 108 along path 114. The content may be redirected to the cloud service 112 or the second clearing device 104. For example, a routing server (not shown), application service, or the destination device 108 itself may recognize the attempt to share content and redirect the content. The second clearing device 104 and cloud service 112 may then act as described above, including sending the content to the destination device 108 after approval is indicated by the second clearing device 104. In the example where the content is sent along path 114 directly to the destination device 108, the destination device 108 may lock the content until approval is received from the second clearing device 104. A request to view the content may be sent to the second clearing device 104 directly or through the cloud service 112.

In an example, an automatic allowance system may be set up at the cloud service 112 to automatically allow content sharing when the content is identical or similar to previously approved content. For example, when the cloud service 112 receives an indication of approval for sharing content from the first clearing device 102, the cloud service 112 may receive a hash value for the content in an encrypted file from the first clearing device 102 or the originating device 106. The cloud service 112 may store the hash value in the database 110. The cloud service 112 may receive a request for sharing content, the request including unknown encrypted content from the originating device 106 or the first clearing device 102. The cloud service 112 may use a processor to determine that the unknown encrypted content is identical to previous content using the hash value (e.g., comparing a hash value of the unknown encrypted content to the hash value stored in the database 110. In an example, the cloud service 112 may send the unknown encrypted media content to the destination device 108 or the second clearing device 104 without receiving approval from the first clearing device when the unknown encrypted content is identical to previous content that was previously approved by the first clearing device 102. For example, the database 110 may store a plurality of hash values corresponding to approved or rejected content. Then, when the cloud service 112 receives a request to share content from the originating device 106, the cloud service 112 may compare the content (e.g., a hash value for an encrypted file) to the stored hash values in the database 110 to determine if the content was previously approved or rejected. When the content was previously approved and the first clearing device 102 has automatic approval set up, the cloud service 112 may automatically forward the content without action by the first clearing device 102. When the content was previously rejected and the first clearing device 102 has automatic rejection set up, the cloud service 112 may automatically reject the content sharing request (and send an indication to the originating device 106) without action by the first clearing device 102.

In another example, the cloud service 112 may receive a request for sharing content, the request including similar encrypted content to previously shared encrypted content. The similarity may be determined by the cloud service 112 using a processor to determine that content of the similar encrypted content is within a deviation tolerance of content of the encrypted content using an algorithm, such as a skin detection algorithm, a frame comparison algorithm, or a banned word list detection algorithm. The cloud service 112 may send, in response to determining the similar encrypted content is within the deviation tolerance, the encryption key and the similar encrypted content to the destination device 108 or the second clearing device 104 without action from the first clearing device 102 when the first clearing device 102 has automatic approval for similar content set up. When the similar encrypted content is outside the deviation tolerance, the cloud service 112 may send the content or a summary to the first clearing device 102 for requesting approval as if the content was new shared content, as previously described.

In an example, the second clearing device 104 may or may not have automatic approval set up or automatic approval for similar content set up. The cloud service 112 may automatically approve, reject, or send along the content to the second clearing device 104 or the destination device 108 based on the set up, similarly to the operations related to sharing content from the originating device 106 and the first clearing device 102 described above. Any combination of use of obtaining approval from the first clearing device 102, obtaining approval from the second clearing device 104, automatic approval set up for either device, or automatic approval for similar content set up for either device may be used in the system 100.

In an example, the system 100 may include additional clearing devices (e.g., approval may come from the first clearing device 102 or a third clearing device or approval must come from both the first clearing device 102 and a third clearing device). In another example, the originating device 106 may attempt to share with a plurality of destination devices, each of which may have a respective clearing device or may not use a clearing device. In yet another example, default options may be set up for a clearing device. For example, a specific URL, domain, content type (e.g., image file, movie, audio file, etc.), to or from the originating device 106, or to or from the destination device 108 may be given specific rules (e.g., always allow to this domain, always allow audio files, deny these destination devices, deny all movies, etc.). In another example, default options may include time-based rules, such as automatically allowing content to be shared or rejecting content from being shared if the first clearing device 102 fails to indicate approval or denial within a predetermined period of time. In still another example, the time-based rules may include expiring approvals or rejections, such as, approve all video files from the originating device 106 for this 2 hour period (which may repeat each day or be a one-time approval), allow a specific URL during a specified month, reject all content shared in the next twenty minutes, etc. In another example, geo-location-based approvals or rejections may be implemented, such as, always deny content requests to share from a specific location (e.g., school).

In an example, the indication of approval may be initiated by receiving a user input indicating approval on a user interface of the first clearing device 102 or the second clearing device 104. In an example, content to be shared may be created or modified by the originating device 106 or may be stored remotely from the originating device 106 (e.g., the originating device requests to share content via a link to a content aggregation service or content hosting server).

In an example, automatic approval may be based on crowd-sourced approvals or denials. For example, particular content may be shared by many devices using the system 100. The first clearing device 102 may set a minimum rating or percentage approval for automatically allowing the particular content to be shared. For example, the cloud service 112 may receive ratings (e.g., grades, content-specific ratings such as movie ratings, or the like) or may aggregate approvals. The first clearing device 102 may select a maximum movie rating (e.g., PG-13) or a minimum percentage, such as 70% approval from clearing devices. Further granularity may be used to personalize the automatic approvals. For example, age range or desired content levels may be preset and then ratings or approvals may be aggregated along with the age range or desired content levels to provide options for automatic approval settings.

Figure 2:
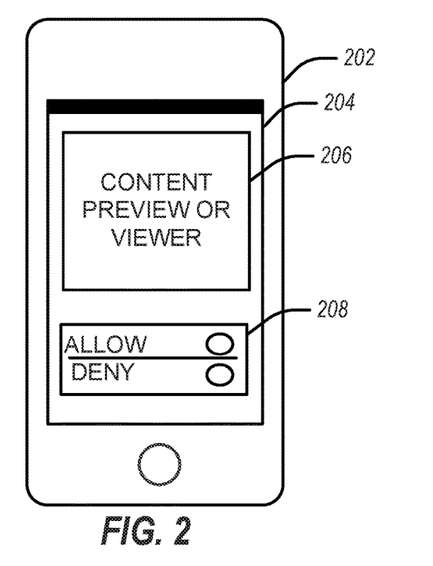
FIG. 2 illustrates a mobile device for controlling media content sharing in accordance with some embodiments.

FIG. 2 illustrates a mobile device 202 for controlling media content sharing in accordance with some embodiments. The mobile device 202 includes a display 204 for showing content 206 and selection options 208. The mobile device 202 may be used as a clearing device (e.g., the first clearing device 102 or the second clearing device 104) to approve or deny content requested to be shared by an originating device to a destination device. The display 204 may show content 206, or may show a summary, such as the summaries described above.

Figure 3:
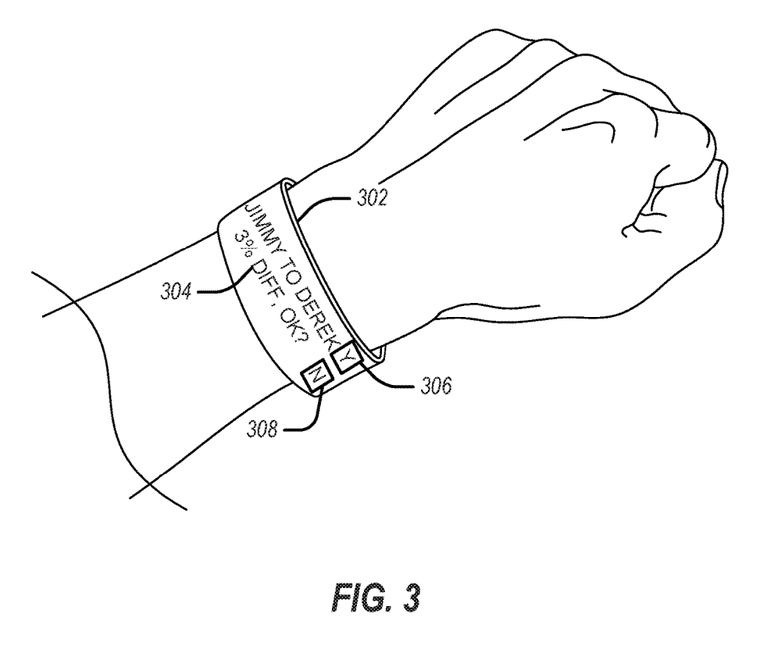
FIG. 3 illustrates a wearable device for controlling media content sharing in accordance with some embodiments.

FIG. 3 illustrates a wearable device 302 for controlling media content sharing in accordance with some embodiments. The wearable device 302 displays a message 304 and selection options 306 and 308. The wearable device 302 may be used as a clearing device (e.g., the first clearing device 102 or the second clearing device 104) to approve or deny content requested to be shared by an originating device to a destination device. The wearable device 302 may be connected to another device, (e.g., the mobile device 202), which may show content or may show a summary, such as the summaries described above.

Figure 4:
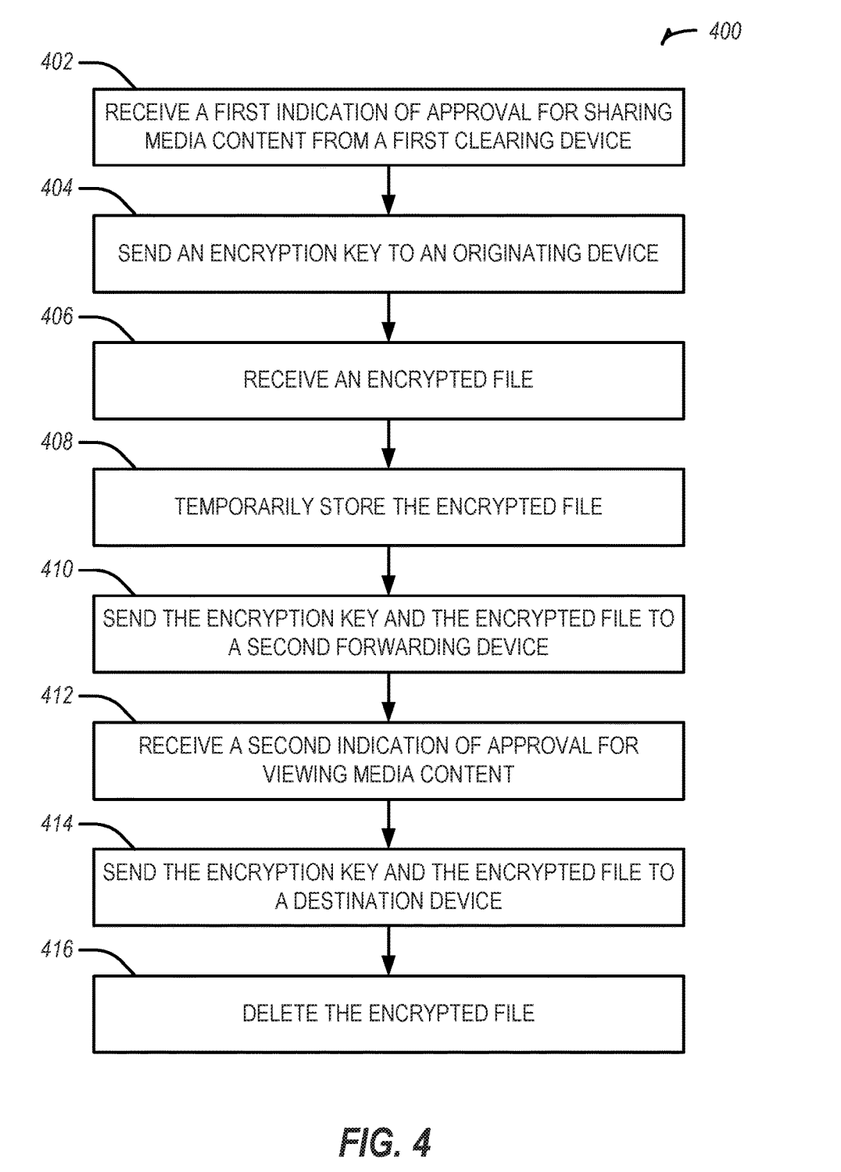
FIG. 4 illustrates a flowchart showing a technique for sharing media content in accordance with some embodiments.

FIG. 4 illustrates a flowchart showing a technique 400 for sharing media content in accordance with some embodiments. The technique 400 includes an operation 402 to receive, from a first clearing device, a first indication of approval for sharing media content from an originating device, the first indication identifying the originating device. Operation 402 may include receiving a hash value for the encrypted media content and further comprising storing the hash value in the database. In an example, operation 402 includes receiving an email from an account of an owner of the first clearing device. In another example, the originating device is controlled by a ward and the first clearing device is controlled by a caretaker of the ward. In an example, operation 402 includes receiving an automatic approval based on a predetermined approval selection, the predetermined approval selection corresponding to an app used to originate the media content at the origination device.

The technique 400 includes an operation 404 to send an encryption key for sharing the media content to the originating device. The technique 400 includes an operation 406 to receive an encrypted file, the encrypted file including the media content encrypted using the encryption key from the originating device. The technique 400 includes an operation 408 to temporarily store the encrypted file in a database. In an example, operation 408 includes temporarily storing the encryption key in the database.

The technique 400 includes an operation 410 to send the encryption key and the encrypted file to a second clearing device. In an example, operation 410 includes sending a summary of the media content. The summary may include an image collage, analytics about the media content, a similarity score for the media content to other media content, a rating, or a change log. The technique 400 includes an operation 412 to receive, from the second clearing device, a second indication of approval for viewing media content, the second indication identifying a destination device. The technique 400 includes an operation 414 to send, in response to receiving the second indication of approval, the encryption key and the encrypted file to the destination device. The technique 400 includes an operation 416 to delete the encrypted file from the database. In an example, operation 416 includes deleting the encryption key from the database.

The technique 400 may include an operation to insert an advertisement into the encrypted file before sending the encryption key and the encrypted file to the second clearing device. In an example, the technique 400 includes an operation to create, at the cloud-based service, the encryption key. In another example, the technique 400 includes an operation to receive a request for sharing media content, the request including unknown encrypted media content, determine that the unknown encrypted media content corresponds to the media content using the hash value, and send the unknown encrypted media content to the destination device or the second clearing device without receiving approval from the first clearing device. In yet another example, the technique 400 includes an operation to receive a request for sharing media content, the request including similar encrypted media content and the encrypted media content, determine that content of the similar encrypted media content is within a deviation tolerance of content of the encrypted media content using a skin detection algorithm, a frame comparison algorithm, or a banned word list detection algorithm, and send, in response to determining the similar encrypted media content is within the deviation tolerance, the encryption key and the similar encrypted media content to the destination device without receiving approval from the first clearing device. The technique 400 may include sending the encryption key and the similar encrypted media content to the destination device without receiving approval from the second clearing device.

Figure 5:
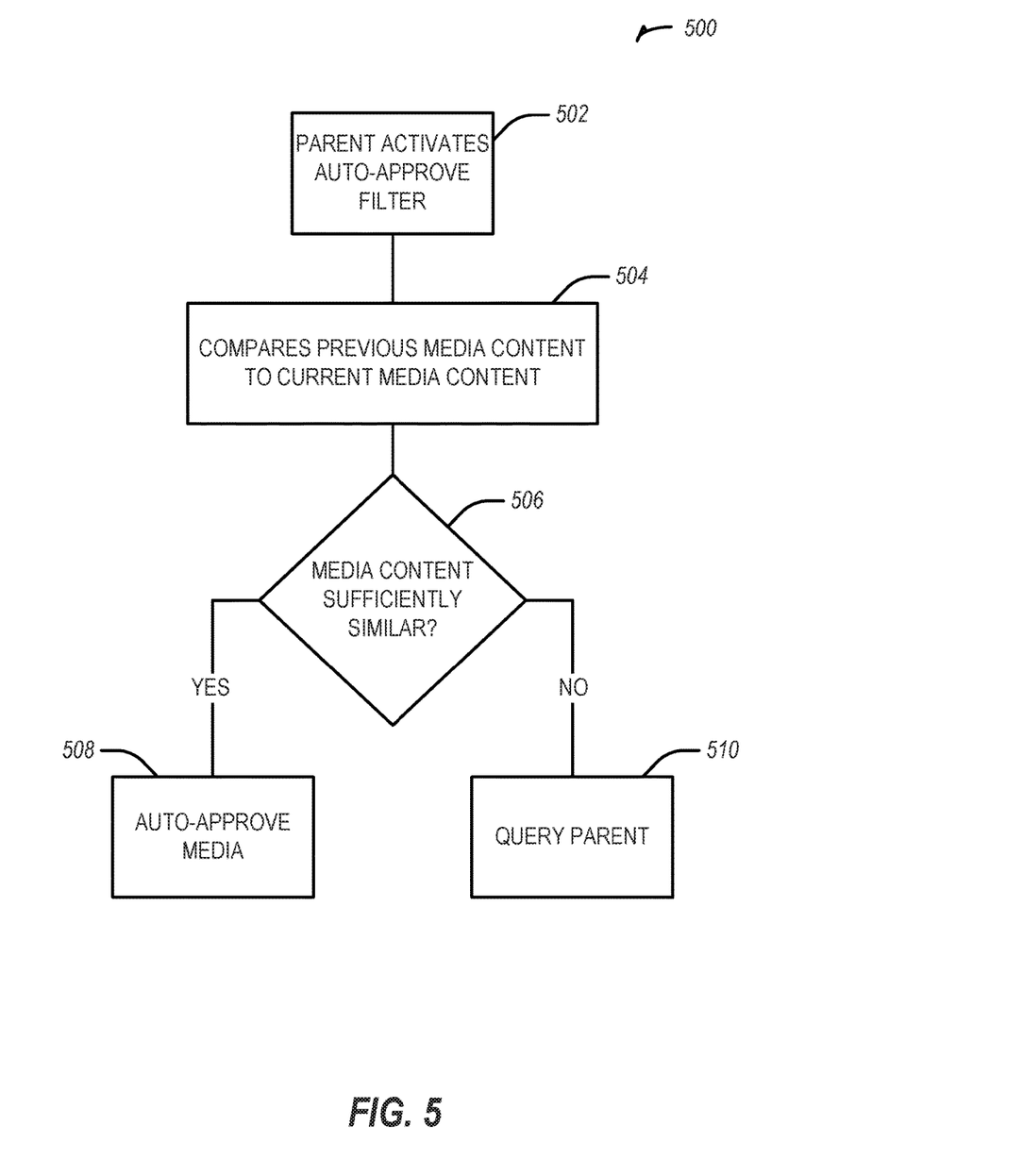
FIG. 5 illustrates a flowchart showing a technique for automatically approving permission-based secure media content sharing in accordance with some embodiments.

FIG. 5 illustrates a flowchart showing a technique 500 for automatically approving permission-based secure media content sharing in accordance with some embodiments. The technique 500 includes an operation 502 to activate an automatic approval filter at a clearing device. The technique 500 includes an operation 504 to compare previously shared media content to media content in a current share request. The technique 500 includes an operation 506 to determine whether the media content in the current share request is sufficiently similar (or identical) to the previously shared media content. The technique 500 includes an operation 508 to automatically approve the media content for sharing, in response to determining that the media content in the current share request is sufficiently similar (or identical) to the previously shared media content. For example, the current share request may be determined to be sufficiently similar when fewer than a maximum number of words have been added or deleted, fewer than a maximum number of frames are added, deleted, or changed, a change is within a range of an amount of time of content added or deleted, or the like. The technique 500 includes an operation 510 to not automatically approve the media content for sharing, in response to determining that the media content in the current share request is not sufficiently similar (or not identical) to the previously shared media content. Operation 510 may include sending a request to review the media content for sharing to the clearing device.

Figure 6:
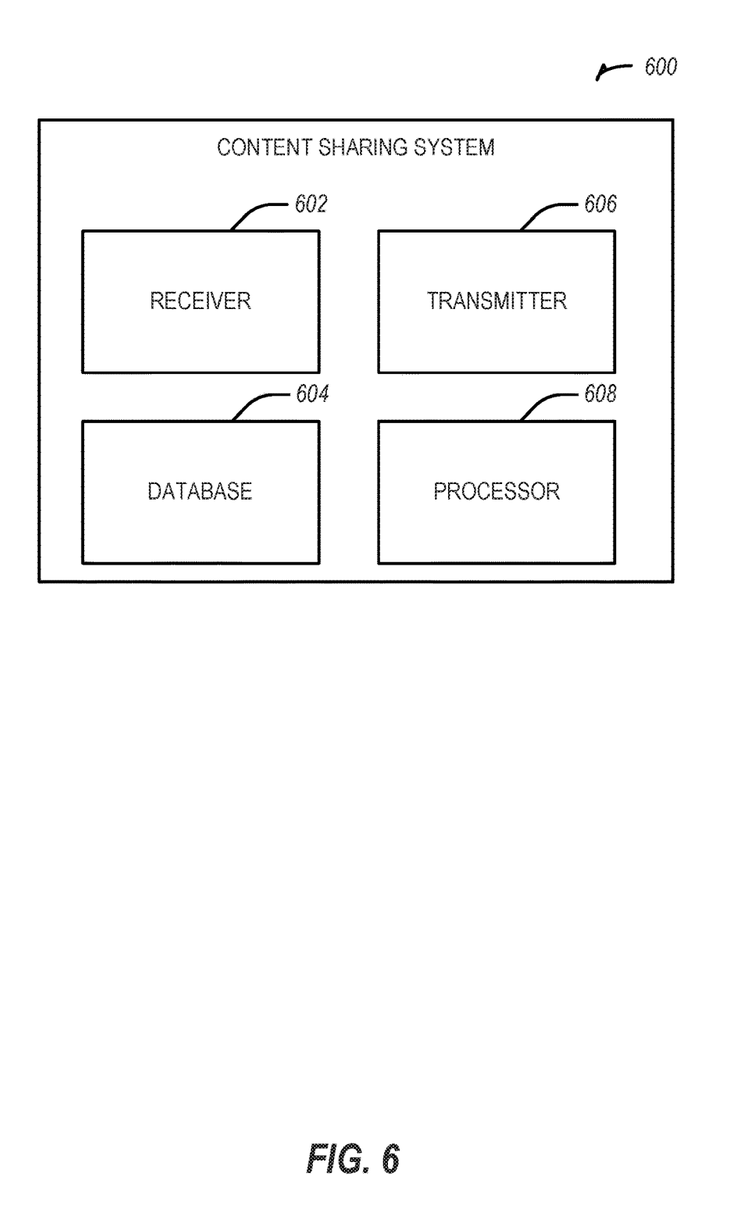
FIG. 6 illustrates a cloud-based content sharing system in accordance with some embodiments.

FIG. 6 illustrates a content sharing system 600 in accordance with some embodiments. The content sharing system 600 includes a receiver 602, a database 604, and a transmitter 606. The content sharing system 600 may include a processor 608. The content sharing system 600 may be a cloud-based or server content sharing system or may be a trusted or third-party system. The receiver 602, the database 604, or the transmitter 606, may be cloud-implemented. The receiver 602, database 604, and transmitter 606 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entitles may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

The receiver 602 may be used to receive, from a first clearing device, a first indication of approval for sharing media content from an originating device, the first indication identifying the originating device, receive an encrypted file, the encrypted file including the media content encrypted using an encryption key from the originating device, and receive, from a second clearing device, a second indication of approval for viewing media content, the second indication identifying a destination device. In an example, the receiver 602 may be used to receive a hash value for the encrypted media content and wherein the database is further to store the hash value. In an example, receiver 602 may be used to receive a request for sharing media content, the request including unknown encrypted media content. In another example, receiver 602 may be used to receive a request for sharing media content, the request including similar encrypted media content and the encrypted media content. In an example, the first indication of approval may be received as an email from an account of an owner of the first clearing device. In another example, the receiver 602 may be used to receive an automatic approval based on a predetermined approval selection, the predetermined approval selection corresponding to an app used to originate the media content at the origination device.

The database 604 may be used to temporarily store the encrypted file in the database after receipt by the receiver, delete the encrypted file from the database in response to the encrypted file being sent by the transmitter, and temporarily store the encryption key in the database. The database 604 may be used to delete the encryption key from the database.

The transmitter 606 may be used to send the encryption key for sharing the media content to the originating device, send the encryption key and the encrypted file to a second clearing device, and send, in response to receiving the second indication of approval, the encryption key and the encrypted file to the destination device. In an example, the transmitter 606 may be used to insert an advertisement into the encrypted file before sending the encryption key and the encrypted file to the second clearing device. In another example, the transmitter 606 may be used to send the unknown encrypted media content to the destination device or the second clearing device without receiving approval from the first clearing device. In another example, the transmitter 606 may be used to send, in response to determining the similar encrypted media content is within the deviation tolerance, the encryption key and the similar encrypted media content to the destination device without receiving approval from the first clearing device. The transmitter 606 may be used to send the encryption key and the similar encrypted media content to the destination device without receiving approval from the second clearing device. In an example, the transmitter 606 may be used to send a summary of the media content. The summary may include an image collage, analytics about the media content, a similarity score for the media content to other media content, a rating, or a change log.

The processor 608 may be used to create the encryption key. In an example, the processor 608 may be used to determine that the unknown encrypted media content corresponds to the media content using the hash value. In another example, the processor 608 may be used to determine that content of the similar encrypted media content is within a deviation tolerance of content of the encrypted media content using at least one of a skin detection algorithm, a frame comparison algorithm, and a banned word list detection algorithm. For example, the skin detection algorithm may determine an amount of skin shown in image or video content for each frame and compare the determined amount to a previously determined amount for a previous image or video content. The frame comparison algorithm may determine differences on a frame-by-frame basis and the deviation tolerance may include a number of changes, a number of frames, or the like. The banned word list detection algorithm may determine whether a word on a banned word list is audible or visible in the media content. In an example, the originating device is controlled by a ward and the first clearing device is controlled by a caretaker of the ward.

Figure 7:
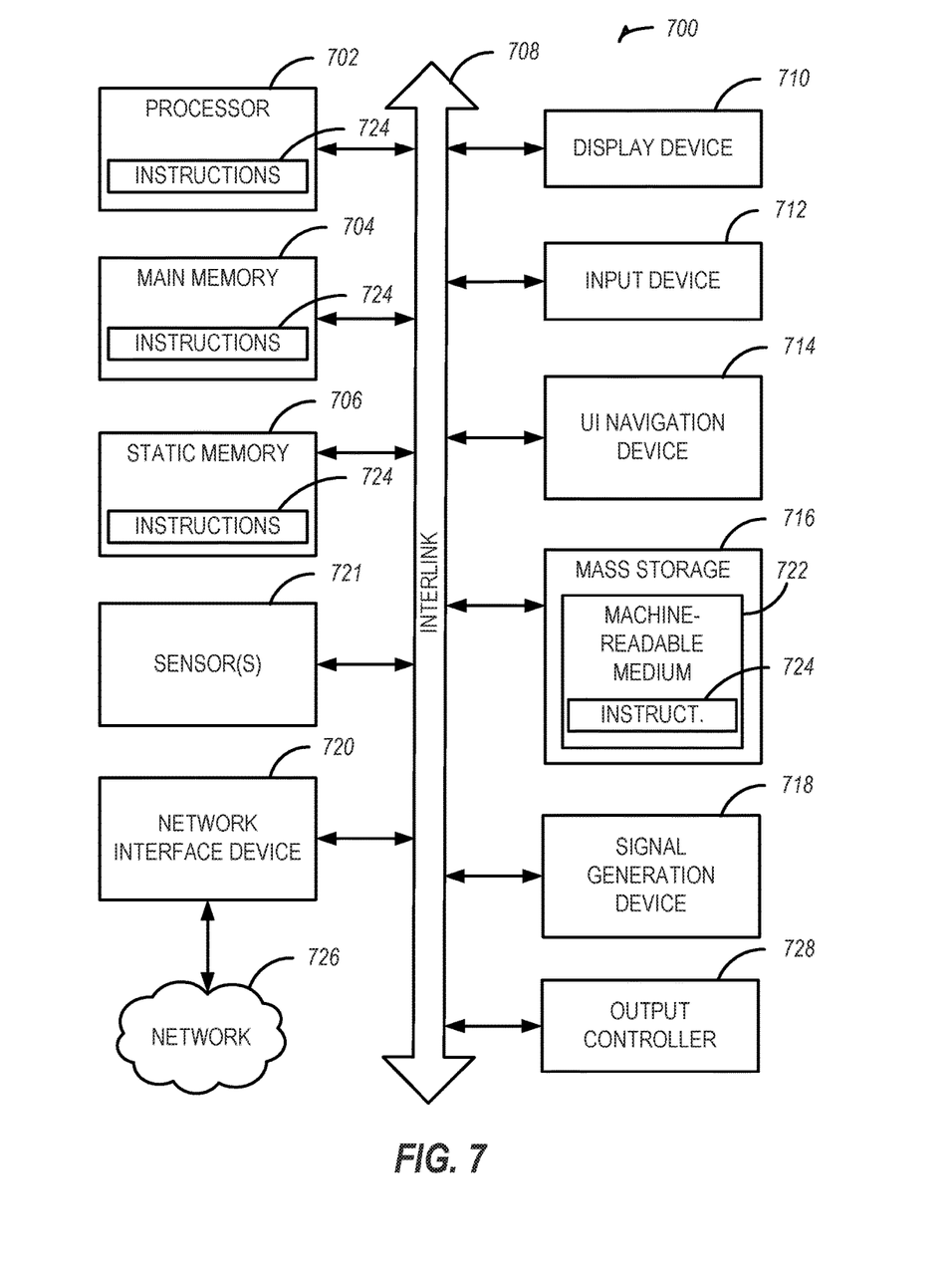
FIG. 7 illustrates generally an example of a block diagram of a machine upon which any one or more of the techniques discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.11.1 standards known as Bluetooth®, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 is a system for sharing media content, the system comprising: a receiver to: receive, from a first clearing device, a first indication of approval for sharing media content from an originating device, the first indication identifying the originating device; receive an encrypted file, the encrypted file including the media content encrypted using an encryption key from the originating device; receive, from a second clearing device, a second indication of approval for viewing media content, the second indication identifying a destination device; a database to: store the encrypted file in the database after receipt by the receiver; delete the encrypted file from the database in response to the encrypted file being sent by the transmitter; and a transmitter to: send the encryption key for sharing the media content to the originating device; send the encryption key and the encrypted file to a second clearing device; send, in response to receiving the second indication of approval, the encryption key and the encrypted file to the destination device.

In Example 2, the subject matter of Example 1 optionally includes wherein the transmitter is further to insert an advertisement into the encrypted file before sending the encryption key and the encrypted file to the second clearing device.

In Example 3, the subject matter of any one or more of Examples 1-2 optionally include a processor to create the encryption key.

In Example 4, the subject matter of any one or more of Examples 1-3 optionally include wherein to store the encrypted file in the database, the database is to store the encryption key in the database.

In Example 5, the subject matter of Example 4 optionally includes wherein to delete the encrypted file from the database, the database is to delete the encryption key from the database.

In Example 6, the subject matter of any one or more of Examples 1-5 optionally include wherein to receive the first indication of approval for sharing the media content, the receiver is to receive a hash value for the encrypted media content and wherein the database is further to store the hash value.

In Example 7, the subject matter of Example 6 optionally includes wherein the receiver is further to receive a request for sharing media content, the request including unknown encrypted media content; further comprising a processor in communication with the database, the processor to determine that the unknown encrypted media content corresponds to the media content using the hash value; and wherein the transmitter is further to send the unknown encrypted media content to the destination device or the second clearing device without receiving approval from the first clearing device.

In Example 8, the subject matter of any one or more of Examples 1-7 optionally include wherein the receiver is further to receive a request for sharing media content, the request including similar encrypted media content and the encrypted media content; further comprising a processor in communication with the database, the processor to determine that content of the similar encrypted media content is within a deviation tolerance of content of the encrypted media content using at least one of a skin detection algorithm, a frame comparison algorithm, and a banned word list detection algorithm; and wherein the transmitter is further to send, in response to determining the similar encrypted media content is within the deviation tolerance, the encryption key and the similar encrypted media content to the destination device without receiving approval from the first clearing device.

In Example 9, the subject matter of Example 8 optionally includes wherein to send the encryption key and the similar encrypted media content to the destination device, the transmitter is to send the encryption key and the similar encrypted media content to the destination device without receiving approval from the second clearing device.

In Example 10, the subject matter of any one or more of Examples 1-9 optionally include wherein to receive the first indication, the receiver is to receive an email from an account of an owner of the first clearing device.

In Example 11, the subject matter of any one or more of Examples 1-10 optionally include wherein the originating device is controlled by a ward and the first clearing device is controlled by a caretaker of the ward.

In Example 12, the subject matter of any one or more of Examples 1-11 optionally include wherein to send the encryption key and the encrypted file to the second clearing device, the transmitter is to send a summary of the media content.

In Example 13, the subject matter of Example 12 optionally includes wherein the summary includes at least one of an image collage, analytics about the media content, a similarity score for the media content to other media content, a rating, and a change log.

In Example 14, the subject matter of any one or more of Examples 1-13 optionally include wherein to receive, from the first clearing device, the first indication of approval for sharing the media content, the receiver is to receive an automatic approval based on a predetermined approval selection, the predetermined approval selection corresponding to an app used to originate the media content at the origination device.

Example 15 is a method for sharing media content, the method comprising: at a cloud-based service: receiving, from a first clearing device, a first indication of approval for sharing media content from an originating device, the first indication identifying the originating device; sending an encryption key for sharing the media content to the originating device; receiving an encrypted file, the encrypted file including the media content encrypted using the encryption key from the originating device; storing the encrypted file in a database; sending the encryption key and the encrypted file to a second clearing device; receiving, from the second clearing device, a second indication of approval for viewing media content, the second indication identifying a destination device; sending, in response to receiving the second indication of approval, the encryption key and the encrypted file to the destination device; and deleting the encrypted file from the database.

In Example 16, the subject matter of Example 15 optionally includes inserting an advertisement into the encrypted file before sending the encryption key and the encrypted file to the second clearing device.

In Example 17, the subject matter of any one or more of Examples 15-16 optionally include creating, at the cloud-based service, the encryption key.

In Example 18, the subject matter of any one or more of Examples 15-17 optionally include wherein storing the encrypted file in the database includes storing the encryption key in the database.

In Example 19, the subject matter of Example 18 optionally includes wherein deleting the encrypted file from the database includes deleting the encryption key from the database.

In Example 20, the subject matter of any one or more of Examples 15-19 optionally include wherein receiving the first indication of approval for sharing the media content includes receiving a hash value for the encrypted media content and further comprising storing the hash value in the database.

In Example 21, the subject matter of Example 20 optionally includes receiving a request for sharing media content, the request including unknown encrypted media content; determining that the unknown encrypted media content corresponds to the media content using the hash value; and sending the unknown encrypted media content to the destination device or the second clearing device without receiving approval from the first clearing device.

In Example 22, the subject matter of any one or more of Examples 15-21 optionally include receiving a request for sharing media content, the request including similar encrypted media content and the encrypted media content; determining that content of the similar encrypted media content is within a deviation tolerance of content of the encrypted media content using at least one of a skin detection algorithm, a frame comparison algorithm, and a banned word list detection algorithm; and sending, in response to determining the similar encrypted media content is within the deviation tolerance, the encryption key and the similar encrypted media content to the destination device without receiving approval from the first clearing device.

In Example 23, the subject matter of Example 22 optionally includes wherein sending the encryption key and the similar encrypted media content to the destination device includes sending the encryption key and the similar encrypted media content to the destination device without receiving approval from the second clearing device.

In Example 24, the subject matter of any one or more of Examples 15-23 optionally include wherein receiving the first indication includes receiving an email from an account of an owner of the first clearing device.

In Example 25, the subject matter of any one or more of Examples 15-24 optionally include wherein the originating device is controlled by a ward and the first clearing device is controlled by a caretaker of the ward.

In Example 26, the subject matter of any one or more of Examples 15-25 optionally include wherein sending the encryption key and the encrypted file to the second clearing device includes sending a summary of the media content.

In Example 27, the subject matter of Example 26 optionally includes wherein the summary includes at least one of an image collage, analytics about the media content, a similarity score for the media content to other media content, a rating, and a change log.

In Example 28, the subject matter of any one or more of Examples 15-27 optionally include wherein receiving, from the first clearing device, the first indication of approval for sharing the media content includes receiving an automatic approval based on a predetermined approval selection, the predetermined approval selection corresponding to an app used to originate the media content at the origination device.

Example 29 is at least one machine-readable medium including instructions for operation of a computing system, which when executed by a machine, cause the machine to perform operations of any of the methods of Examples 15-28.

Example 30 is an apparatus comprising means for performing any of the methods of Examples 15-28.

Example 31 is an apparatus for sharing media content, the apparatus comprising: means for receiving, from a first clearing device, a first indication of approval for sharing media content from an originating device, the first indication identifying the originating device; means for sending an encryption key for sharing the media content to the originating device; means for receiving an encrypted file, the encrypted file including the media content encrypted using the encryption key from the originating device; means for storing the encrypted file in a database; means for sending the encryption key and the encrypted file to a second clearing device; means for receiving, from the second clearing device, a second indication of approval for viewing media content, the second indication identifying a destination device; means for sending, in response to receiving the second indication of approval, the encryption key and the encrypted file to the destination device; and means for deleting the encrypted file from the database.

In Example 32, the subject matter of Example 31 optionally includes means for inserting an advertisement into the encrypted file before sending the encryption key and the encrypted file to the second clearing device.

In Example 33, the subject matter of any one or more of Examples 31-32 optionally include means for creating, at the cloud-based service, the encryption key.

In Example 34, the subject matter of any one or more of Examples 31-33 optionally include wherein the means for storing the encrypted file in the database include means for storing the encryption key in the database.

In Example 35, the subject matter of Example 34 optionally includes wherein the means for deleting the encrypted file from the database include means for deleting the encryption key from the database.

In Example 36, the subject matter of any one or more of Examples 31-35 optionally include wherein the means for receiving the first indication of approval for sharing the media content include means for receiving a hash value for the encrypted media content and further comprising storing the hash value in the database.

In Example 37, the subject matter of Example 36 optionally includes means for receiving a request for sharing media content, the request including unknown encrypted media content; means for determining that the unknown encrypted media content corresponds to the media content using the hash value; and means for sending the unknown encrypted media content to the destination device or the second clearing device without receiving approval from the first clearing device.

In Example 38, the subject matter of any one or more of Examples 31-37 optionally include means for receiving a request for sharing media content, the request including similar encrypted media content and the encrypted media content; means for determining that content of the similar encrypted media content is within a deviation tolerance of content of the encrypted media content using at least one of a skin detection algorithm, a frame comparison algorithm, and a banned word list detection algorithm; and means for sending, in response to determining the similar encrypted media content is within the deviation tolerance, the encryption key and the similar encrypted media content to the destination device without receiving approval from the first clearing device.

In Example 39, the subject matter of Example 38 optionally includes wherein the means for sending the encryption key and the similar encrypted media content to the destination device include means for sending the encryption key and the similar encrypted media content to the destination device without receiving approval from the second clearing device.

In Example 40, the subject matter of any one or more of Examples 31-39 optionally include wherein the means for receiving the first indication include means for receiving an email from an account of an owner of the first clearing device.

In Example 41, the subject matter of any one or more of Examples 31-40 optionally include wherein the originating device is controlled by a ward and the first clearing device is controlled by a caretaker of the ward.

In Example 42, the subject matter of any one or more of Examples 31-41 optionally include wherein the means for sending the encryption key and the encrypted file to the second clearing device include means for sending a summary of the media content.

In Example 43, the subject matter of Example 42 optionally includes wherein the summary includes at least one of an image collage, analytics about the media content, a similarity score for the media content to other media content, a rating, and a change log.

In Example 44, the subject matter of any one or more of Examples 31-43 optionally include wherein the means for receiving, from the first clearing device, the first indication of approval for sharing the media content include means for receiving an automatic approval based on a predetermined approval selection, the predetermined approval selection corresponding to an app used to originate the media content at the origination device.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for sharing media content, the system comprising:
    a hardware-implemented receiver to:
        receive, from a first clearing device, a first indication of approval for sharing first media content from an originating device, the first indication identifying the originating device;
        receive an encrypted file, the encrypted file including the first media content encrypted using an encryption key from the originating device;
        receive, from a second clearing device, a second indication of approval for viewing the first media content, the second indication identifying a destination device;
    a hardware-implemented database to:
        store the encrypted file in the database after receipt by the receiver;
        delete the encrypted file from the database in response to the encrypted file being sent by the transmitter; and
    a hardware-implemented transmitter to:
        send the encryption key for sharing the first media content to the originating device;
        send the encryption key and the encrypted file to the second clearing device; and
        send, in response to receiving the second indication of approval, the encryption key and the encrypted file to the destination device,
    wherein to receive the first indication of approval for sharing the media content, the hardware-implemented receiver is to receive a hash value for the encrypted media content and wherein the hardware-implemented database is to store the hash value, and
    wherein the receiver is further to receive a request for sharing additional media content, the request including unknown encrypted media content, the unknown encrypted media content corresponding in similarity to the first media content using the hash value, wherein the unknown encrypted media content and the first media content are not identical; and
    wherein the hardware-implemented transmitter is to send the unknown encrypted media content to the destination device without receiving approval from the first clearing device.

2. The system of claim 1, wherein the hardware-implemented transmitter is further to insert an advertisement into the encrypted file before sending the encryption key and the encrypted file to the second clearing device.

3. The system of claim 1, further comprising a processor to create the encryption key.

4. The system of claim 1, wherein to store the encrypted file in the hardware-implemented database, the hardware-implemented database is to store the encryption key in the database.

5. The system of claim 4, wherein to delete the encrypted file from the hardware-implemented database, the hardware-implemented database is to delete the encryption key from the database.

6. The system of claim 5, wherein to send the encryption key and the similar encrypted media content to the destination device, the hardware-implemented transmitter is to send the encryption key and the similar encrypted media content to the destination device without receiving approval from the second clearing device.

7. The system of claim 1, wherein to receive the first indication, the hardware-implemented receiver is to receive an email from an account of an owner of the first clearing device.

8. The system of claim 1, wherein the originating device is controlled by a ward and the first clearing device is controlled by a caretaker of the ward.

9. The system of claim 1, wherein to send the encryption key and the encrypted file to the second clearing device, the transmitter is to send a summary of the first media content.

10. The system of claim 9, wherein the summary includes at least one of: an image collage, analytics about the first media content, a similarity score for the first media content to other media content, a rating, and a change log.

11. The system of claim 1, wherein to receive, from the first clearing device, the first indication of approval for sharing the first media content, the hardware-implemented receiver is to receive an automatic approval based on a predetermined approval selection, the predetermined approval selection corresponding to an app used to originate the first media content at the origination device.

12. A method for sharing media content, the method comprising:
    receiving, from a first clearing device, a first indication of approval for sharing first media content from an originating device, the first indication identifying the originating device;
    sending an encryption key for sharing the first media content to the originating device;
    receiving an encrypted file, the encrypted file including the first media content encrypted using the encryption key from the originating device;
    storing the encrypted file in a database;
    sending the encryption key and the encrypted file to a second clearing device;
    receiving, from the second clearing device, a second indication of approval for viewing the first media content, the second indication identifying a destination device;

sending, in response to receiving the second indication of approval, the encryption key and the encrypted file to the destination device;

deleting the encrypted file from the database;

receiving a hash value for the encrypted media content;

storing the hash value;

receiving a request for sharing additional media content, the request including unknown encrypted media content, the unknown encrypted media content corresponding in similarity to the first media content using the hash value, wherein the unknown encrypted media content and the first media content are not identical; and sending the unknown encrypted media content to the destination device without receiving approval from the first clearing device.

13. The method of claim 12, further comprising inserting an advertisement into the encrypted file before sending the encryption key and the encrypted file to the second clearing device.

14. The method of claim 12, further comprising creating the encryption key.

15. The method of claim 12, wherein storing the encrypted file in the database includes storing the encryption key in the database.

16. The method of claim 15, wherein deleting the encrypted file from the database includes deleting the encryption key from the database.

17. At least one non-transitory machine readable medium, including instructions, which when performed by a machine, cause the machine to:

receive, from a first clearing device, a first indication of approval for sharing first media content from an originating device, the first indication identifying the originating device;

receive an encrypted file, the encrypted file including the first media content encrypted using an encryption key from the originating device;

receive, from a second clearing device, a second indication of approval for viewing the first media content, the second indication identifying a destination device;

temporarily store the encrypted file in the database after receipt by the receiver;

delete the encrypted file from the database in response to the encrypted file being sent by the transmitter;

send the encryption key for sharing the first media content to the originating device;

send the encryption key and the encrypted file to the second clearing device; and send, in response to receiving the second indication of approval, the encryption key and the encrypted file to the destination device, receive a hash value for the encrypted file;

store the hash value in the database;

receive a request for sharing additional media content, the request including unknown encrypted media content;

determine that the unknown encrypted media content corresponds in similarity to the media content using the hash value, wherein the unknown encrypted media content and the first media content are not identical; and send the unknown encrypted media content to the destination device without receiving approval from the first clearing device.

18. The at least one non-transitory machine readable medium of claim 17, wherein the instructions to send the encryption key and the similar encrypted media content to the destination device include instructions to send the encryption key and the similar encrypted media content to the destination device without receiving approval from the second clearing device.

19. The at least one non-transitory machine readable medium of claim 17, wherein the instructions to receive the first indication include instructions to receive an email from an account of an owner of the first clearing device.

* * * * *